Patented Mar. 18, 1941

2,235,802

UNITED STATES PATENT OFFICE 2,235,802

LUMINESCENT SUBSTANCE FOR ELECTRIC DISCHARGE VESSELS

Pierre Lemaigre-Voreaux, Paris, France

No Drawing. Application January 31, 1939, Serial No. 253,945. In France February 3, 1938

6 Claims. (Cl. 250—81)

It is known to use for various purposes in electric discharge vessels, for example cathode ray tubes or luminescent lighting tubes, solid luminescent substances, especially fluorescent substances, consisting of salts of acids comprising oxygen. Such salts are, for instance, zinc silicate, cadmium silicate and calcium tungstate. This invention relates to improved luminescent substances of this kind having a particularly high efficiency.

According to the invention the luminescent substance used for electric discharge vessels comprises a luminescent salt of an oxygen-containing acid and an addition in the free state of an oxide of a metal other than an alkali-metal and having an atomic weight lower than that of silicon, that is an oxide of one of the following metals: beryllium, magnesium or aluminium.

When use is made of a luminescent substance of the above-mentioned kind containing one of these three oxides, the initial output is appreciably greater than that of the same luminescent substance in the absence of the oxide, while the inevitable decrease in the output of the luminescent substance in the course of time is no greater with the oxide than without it. The luminescent substance thus constantly maintains a greater output with the oxide, so that it remains effective for a longer period.

The presence of the oxides in question is particularly advantageous when the luminescent substances of which they form part are applied in electric discharge vessels by means of binding media which exercise a more or less pronounced chemical action upon the luminescent substances. Such is especially the case with binding media comprising boric acid or phosphoric acid.

The oxide preferably constitutes a relatively small proportion of the luminescent substance. For example it may be comprised in the said substance in a proportion varying between 0.5% and 10%. For example, an appreciable increase in output is obtained by simply admixing 1% of magnesia to chemically pure calcium tungstate before applying the latter to a luminescent lighting tube containing a mixture of argon, neon and mercury vapour.

I claim:

1. A luminescent substance for electric discharge vessels comprising a luminescent salt of an oxygen-containing acid having in intimate simple mechanical admixture therewith an uncombined addition of free oxide of a metal selected from the group consisting of beryllium, magnesium and aluminum.

2. A luminescent substance according to claim 1 in which the quantity of the oxide amounts to 0.5% to 10% of the quantity of the luminescent salt.

3. An article of manufacture consisting of an electric discharge vessel which has been coated internally with a luminescent salt of an oxygen-containing acid having in intimate simple mechanical admixture therewith an uncombined addition of free oxide of a metal selected from the group consisting of beryllium, magnesium and aluminum, the binding agent utilized for the coating being a material selected from the group consisting of boric acid and phosphoric acid.

4. In a gaseous electric discharge device containing an atmosphere comprising mercury vapor an internal luminescent coating exposed to the discharge within said device and comprising a luminescent salt of an oxygen-containing acid having in intimate simple mechanical admixture therewith an uncombined addition of free oxide of a metal selected from the group consisting of beryllium, magnesium and aluminum.

5. In a gaseous electric discharge device containing an atmosphere comprising mercury vapor, an internal coating of a luminescent tungstate exposed to the discharge within said device and having a simple intimate admixture therewith in the free state of a relatively small amount of an oxide of a metal selected from the group consisting of beryllium, magnesium and aluminum.

6. In a gaseous electric discharge device containing an atmosphere comprising mercury vapor, an internal coating of luminescent calcium tungstate exposed to the discharge within said device and having a simple intimate admixture therewith in the free state of a relatively small amount of magnesia.

PIERRE LEMAIGRE-VOREAUX.